United States Patent [19]

Moody et al.

[11] Patent Number: 4,583,434
[45] Date of Patent: Apr. 22, 1986

[54] ADJUSTABLE TOOL HOLDER FOR LATHES AND THE LIKE

[75] Inventors: Harry A. Moody; Don H. Skahen, both of New Fairfield; John C. Dunn, Sherman, all of Conn.

[73] Assignee: The Dunham Tool Company, Inc., New Fairfield, Conn.

[21] Appl. No.: 719,024

[22] Filed: Apr. 3, 1985

Related U.S. Application Data

[63] Continuation of Ser. No. 549,625, Nov. 7, 1983, abandoned.

[51] Int. Cl.[4] .............................................. B23B 29/10
[52] U.S. Cl. ....................................... 82/36 R; 82/25
[58] Field of Search ................ 82/36 R, 25, 36 B, 37

[56] References Cited

U.S. PATENT DOCUMENTS

| | | | |
|---|---|---|---|
| 1,502,712 | 7/1924 | Chard | 82/36 R |
| 1,689,710 | 10/1928 | Ashton | 82/25 |
| 1,689,711 | 10/1928 | Ashton | 82/25 |
| 2,391,878 | 1/1946 | Cassia, Jr. | |
| 2,684,608 | 7/1954 | Roman | |
| 2,875,662 | 3/1959 | Poorman | 82/36 R |
| 2,877,536 | 3/1959 | Monosmith | 407/110 |
| 3,566,723 | 3/1971 | Oborne | 82/36 R |
| 3,641,850 | 2/1972 | Peterson | |
| 3,813,971 | 6/1974 | Lemanski | 82/36 R |
| 4,080,854 | 3/1978 | Peterson | |
| 4,100,826 | 7/1978 | Takahashi | 82/25 |

*Primary Examiner*—Lowell A. Larson
*Assistant Examiner*—Jerry Kearns
*Attorney, Agent, or Firm*—Mandeville and Schweitzer

[57] ABSTRACT

The disclosure relates to an adjustable tool holder for a lathes or the like. A base block is secured to the lathe slide by a through bolt engaging a clamping bar in a Tee slot therein. A tool holding block is slideably mounted on the base block and also has a through-bolt extending through it and the base block and engaging the clamping bar. By loosening the second through-bolt and manipulating a micrometer adjustment screw, the cutting tool may be adjusted with great precision. The second through-bolt is then retightened to clamp the movable tool-holding block securely to the cross slide of the machine tool.

6 Claims, 9 Drawing Figures

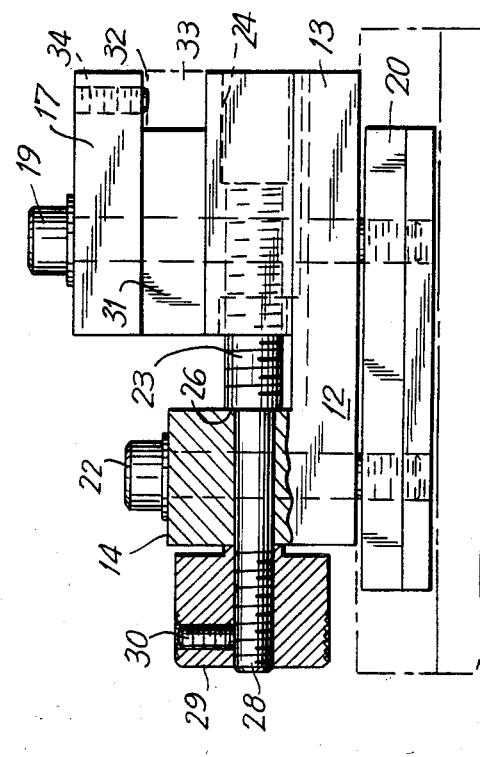
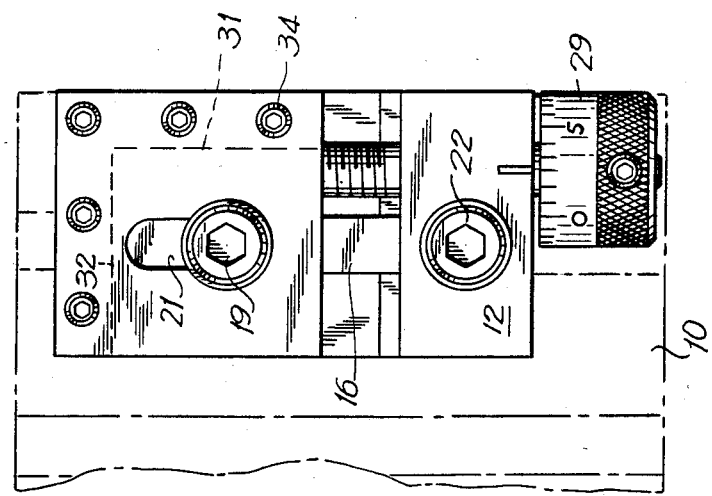
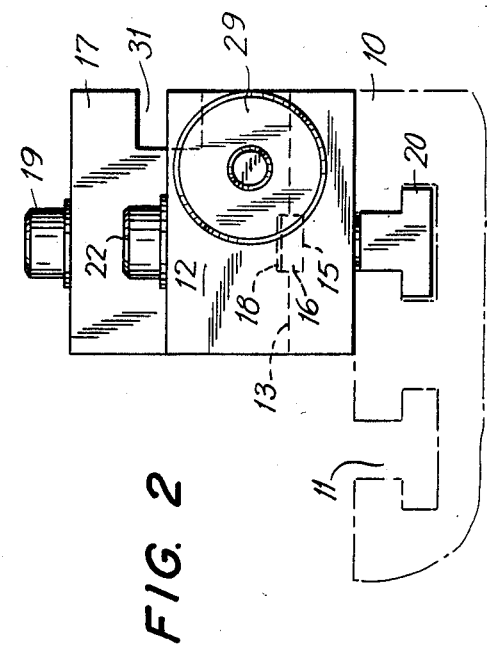

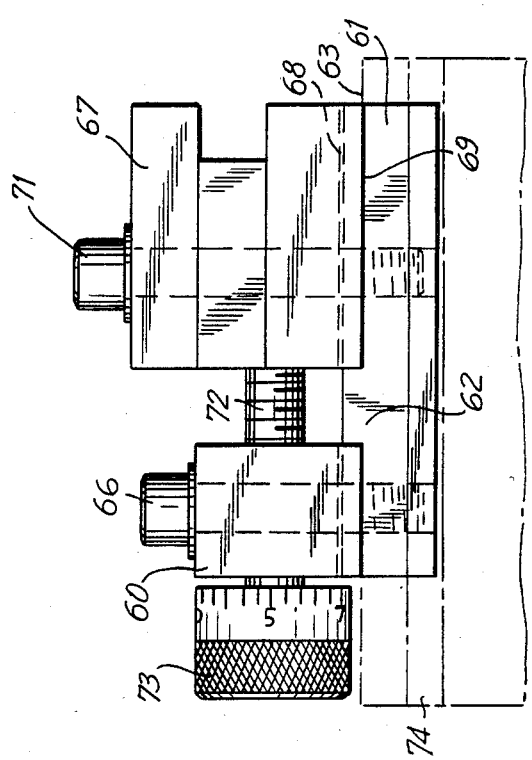
FIG. 7
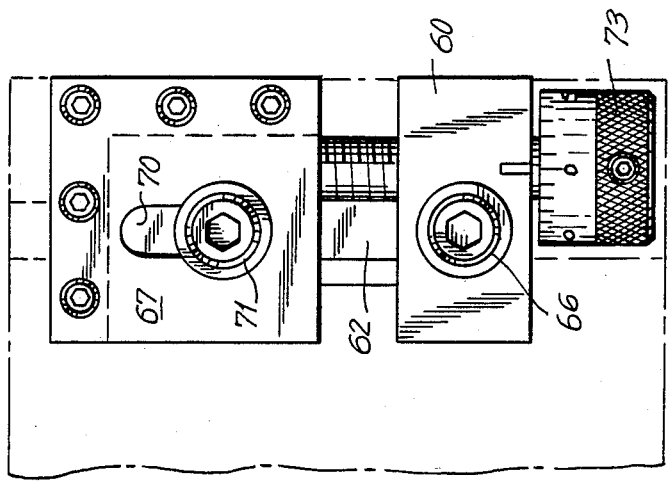
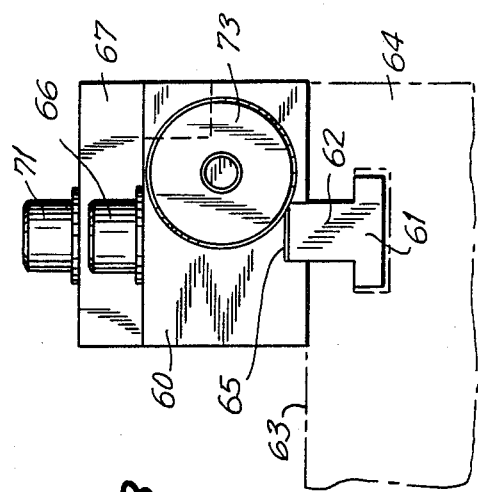
FIG. 9
FIG. 8

ADJUSTABLE TOOL HOLDER FOR LATHES AND THE LIKE

This application is a continuation of Ser. No. 549,625 filed Nov. 7, 1983 and now abandoned.

BACKGROUND AND SUMMARY OF THE INVENTION

Lathes and similar machine tools typically are provided with a controllably movable cross slide, to which cutting tools are mounted. Even though the cross slide may be movable both transversely and longitudinally during cutting operations, it is nevertheless important in many cases to be able to mount the cutting tool to the cross slide with a substantial degree of precision.

Quite typically, adjustment of tool holders on the cutting machine cross slide is accomplished by slightly loosening the clamping bolt or bolts and tapping the tool or tool holder with a hammer. However, this is difficult and time consuming, and precision adjustment is achieved, if at all, only with considerable effort.

It is known, of course, to provide tool holders with precision adjustment features. However, insofar as we are aware, the known devices for this purpose tend to be complex and expensive and, at the same time, less than fully effective.

In accordance with the present invention, a novel and greatly simplified form of precision adjustable tool holder is provided, which is both highly efficient and reliable in operation and, at the same time, is relatively simple in construction.

In accordance with one aspect of the invention, a precision adjustable tool holder is provided in which the unit as a whole is secured to the cross slide of the machine tool by a pair of through-bolts, one of which secures a normally fixed base block and the other of which secures not only the base block but the adjustable tool holding block as well. The through-bolts extend through to an elongated clamping bar, which is received in a Tee slot in the machine cross slide. This construction enables a base block member to be fixed to the cross slide in an approximate position, while accommodating precision, micrometer adjustment of the tool holding block itself. When the tool holding block is properly positioned, the through-bolt extending through it is tightened, which not only fixes the position of the tool block, but also secures it tightly to the elongated clamping bar and thus directly secures it to the cross slide.

In a first modified version of the new tool holder, a pair of adjustably movable tool holding blocks are mounted on a single base block. Each of the tool holding blocks is separately precision adjustable, after which each of the adjustable blocks is clamped tightly, through the base block, to the elongated clamping bar. This arrangement accommodates a high degree of precision in the simultaneous cutting of, for example, a flange, where the respective tools are simultaneously cut on front and back surfaces.

In a second modified version of the new tool holder, the clamping bar is constructed in a manner such that it serves both as a clamping bar and as a base block, enabling some simplification of the structure and a reduction in manufacturing cost.

For a better understanding of the above and other features and advantages of the invention, reference should be made to the following detailed description of a preferred embodiment, and to the accompanying drawing.

DESCRIPTION OF THE DRAWING

FIG. 1 is a top plan view of an adjustable tool holder constructed in accordance with the teachings of the invention.

FIG. 2 is a front elevational view of the tool holder of FIG. 1.

FIG. 3 is a side elevational view of the tool holder of FIG. 1, with certain parts broken away for clarity.

FIG. 7 is a top plan view of a further modified form of the invention, in which functions of the clamping bar and base block are partly combined.

FIGS. 8 and 9 are front and side elevational views of the adjustable tool holder of FIG. 7.

DESCRIPTION OF PREFERRED EMBODIMENTS

Figure 4:
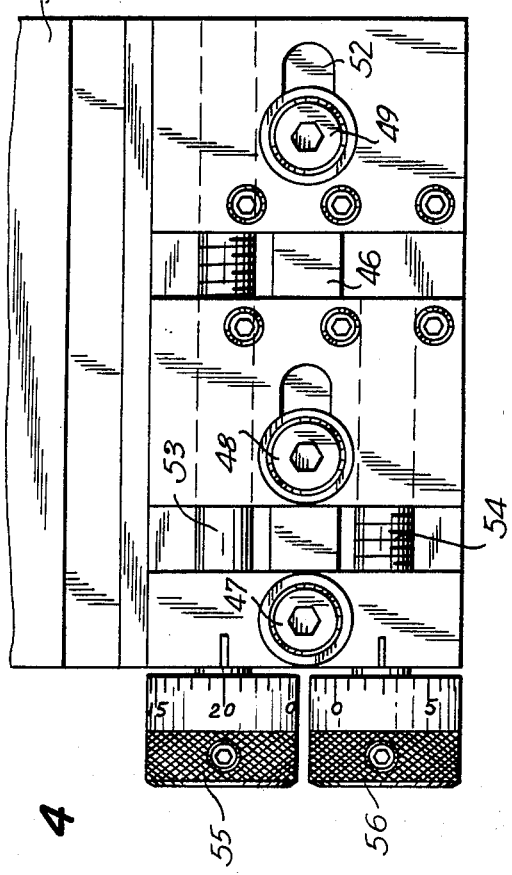
FIG. 4 is a top plan view of an adjustable tool holder according to the invention, provided with multiple, precision adjustable tool holding blocks.

Referring now to the drawing, and initially to FIGS. 1-3, thereof, the reference numeral 10 designates in a general way the cross slide of a conventional machine tool, such as a lathe, screw machine or the like. Typically, such as cross slide is provided with a series of tool-clamping slots 11 of inverted T-shape cross section. In accordance with well known practices, tool holders, jigs, etc. may be mounted on the cross slide by the use of clamping means extending into the T-shaped clamping slots 11. Typically, the clamping means may be in the nature of the square headed bolt, for example.

In accordance with the present invention, an adjustable tool holder is provided which includes a base block 12 of generally L-shaped configuration, comprising a horizontal guide portion 13 and an upwardly projecting reference wall 14. The guide portion 13 is provided with a longitudinally extending recess 15, in which is received a guide key 16 for slideably guiding longitudinal movement of a tool holding block 17.

The tool holding block 17 and the guide portion 13 of the base block are machined to have complementary flat sliding surfaces, such that the tool block is firmly supported by the base block, being limited to guided longitudinal movement by means of the key 16, which is received in a correspondingly shaped guide slot 18 in the tool holding block. The tool holding block 17 is secured to the base block 12 by means of an elongated bolt 19, which extends entirely through the tool holding block, and also through the base block 12, and is threadedly engaged with an elongated clamping bar 20 of T-shaped cross section adapted for slideable reception in the clamping slots 11 of the cross slide.

As shown in FIG. 1, the tool block 17 is provided with a longitudinally extended through slot 21 for the reception of the clamping bolt 19. Accordingly, when the bolt 19 is loosened, the tool holding block 17 may be adjusted longitudinally with respect to the bolt 19 and base block 12.

The base block 12 is itself secured to the cross slide 10, by means of a through bolt 22, which extends through the base block and is threadedly engaged with the elongated clamping bar 20.

A threaded adjustment shaft 23 is rotatably mounted in the reference wall 14 of the base block and is engaged with a threaded bore 24 in the tool holding block 17. A portion 25 of the shaft extends through and is rotatably journaled in the reference wall 14. A shoulder 26 is formed at the base of the main threaded section of the shaft 23, and this shoulder is positioned against the front facing surface 27 of the reference wall 14. A portion 28 of the projecting shaft is threaded for the reception of a calibrated adjustment knob 29. The knob is positioned on the threaded portion 28 to provide a snug front-to-back fit while still accommodating rotational manipulation of the knob 29 and shaft 23, and the knob is secured in that position by means of a set screw 30 or the like.

As reflected in the drawings, the tool holding block 17 is provided with a pair of side-opening grooves 31, 32, either of which is arranged to receive a cutting tool, such as the tool 33 shown in FIG. 3. In this respect, it will be understood that the specific form of the cutting tool as well as the specific form and arrangement of the grooves and/or securing means for the cutting tool are not particularly significant to the invention. A wide variety of cutting tools may be employed within the context of this invention, and the size and shape of the tool holding block 17 may be varied accordingly as will be appreciated by those skilled in the art. In the specifically illustrated arrangement, each of the tool holding slots 31, 32 is provided with a series of tool clamping screws 34, such that the cutting tool may be secured rigidly within the slot.

In the use and operation of the adjustable tool holder as shown in FIGS. 1-3, an appropriate cutting tool 33 is initially mounted and secured in the tool holding block 17. The entire assembly may then be mounted on the cross slide 10, by sliding the clamping bar 20 into an appropriate one of the T-shaped clamping slots 11 in the slide. At this point in time, both of the clamping bolts 19, 22 are loosened, so that the base block 12 may slide freely over the top surface of the cross slide 10. When the tool holder assembly is approximately in the desired position, the base block 12 is tightly secured to the cross slide, by tightening of the clamping bolt 22. The tool itself is then given a precision final adjustment by manipulation of the control knob 29. Once the tool is adjusted to its final position, the clamping bolt 19 is tightened to secure the tool in its working position. The arrangement of the clamping bolt 19 in the above described assembly is particularly significant, in that the bolt not only serves to secure the tool holding block 17 in its adjusted position with respect to the base block 12, but also, significantly, extends through the base block and into the clamping block 20. Accordingly, there is direct securement of the tool holding block 17 to the cross slide itself at a point closely adjacent the cutting tool. This results in superior cutting performance by reducing chatter of the cutting tool. This is particularly significant when the cutting tool is working on the "back" side of the work, where the surface of the work is travelling upwardly with respect to the cutting tool and tending to lift the tool and tool holder off of the cross slide.

Figure 6:
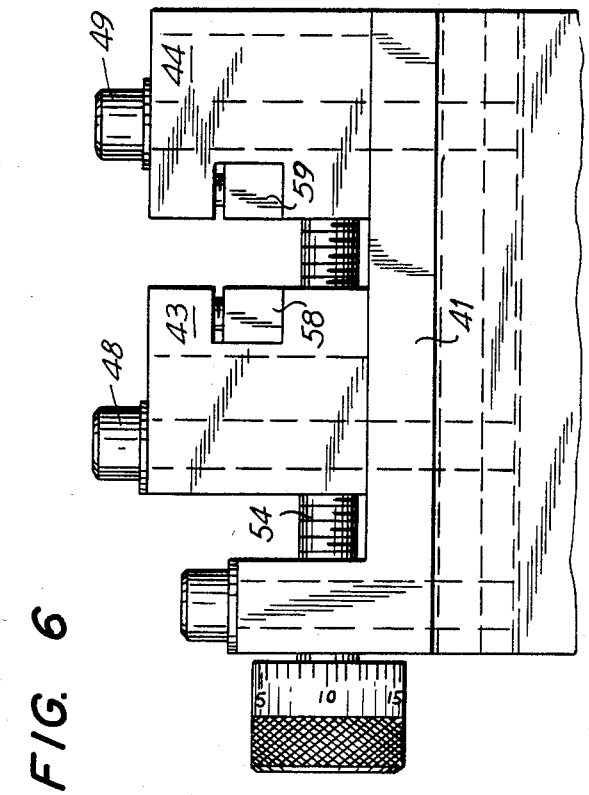
FIGS. 5 and 6 are front and side elevational views respectively of the tool holding block of FIG. 4.
Figure 5:
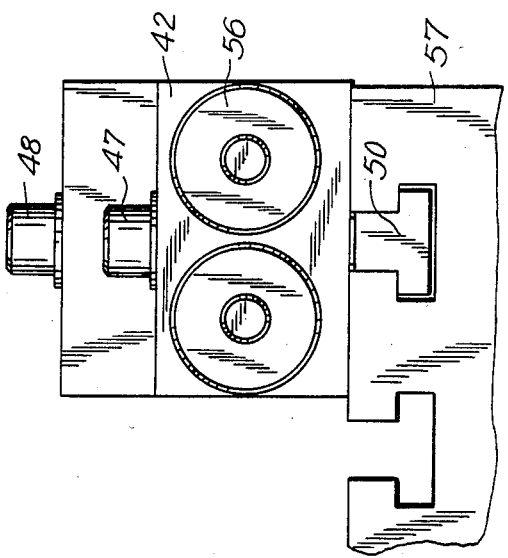

With reference now to the form of the invention shown in FIGS. 4-6, a base block member 40 is provided which includes an elongated guide section 41 and an upright reference wall 42. A pair of tool holding blocks 43, 44 are independently, slideably guided for longitudinal adjusting movement on the guide portion 41. The latter is provided with a common, central keyway 45 mounting a guide key 46 which, in turn, is slideably received in guide slots in the respective tool holding blocks 43, 44.

In the modification of FIGS. 4-6, there are three through-extending clamping bolts 47-49, each extending to and threadedly engaging an elongated, T-shaped clamping bar 50. Elongated through-slots 51, 52 are provided in the respective adjustable tool holding blocks 43, 44, to accommodate movement of the blocks in relation to the respective through-bolts 48, 49.

A pair of micrometer adjusting shafts 53, 54 are mounted side by side. The shaft 53 extends slideably through the first tool holding block 43 and threadedly engages the second block 44, while the adjacent shaft 54 extends into and threadedly engages the first block 43. Both of the shafts 53, 54 are rotatably journaled in the reference wall 42, while being fixed against axial movement with respect thereto, substantially as described with respect to the embodiment of FIGS. 1-3. Accordingly, by manipulation of respective calibrated micrometer knobs 55, 56, the tool holding blocks 43, 44 may be independently adjusted relative to the base block 40.

Operation of the device of FIGS. 4-6 is similar to that of the device of FIGS. 1-3. The base block 40 is initially mounted on a cross slide 57 by slideable insertion of the elongated clamping bar 50 into the clamping slots of the slide. All of the through-bolts 47-49 are at this time relatively loosened. When the base block 40 is approximately positioned as desired, the base block clamping bolt 47 is secured, fixing the position of the base block on the slide. Thereafter, the respective micrometer knobs 55, 56 are manipulated for precise final adjustment of cutting tools 58, 59 with respect to the cross slide 57 and to each other, after which the respective individual clamping bolts 48, 49 are secured.

In the embodiment of FIGS. 4-6, as in the first described embodiment, the tool holding blocks are secured in position by bolts 48, 49 which extend through the base block and into threaded engagement with the elongated clamping bar 50. Thus, by tightening of the bolts 48, 49, not only are the tool holding blocks secured in position, they are also independently secured down tightly to the cross slide itself, at a position closely adjacent to the working portion of the cutting tool. This provides significantly superior performance in relation to known adjustable tool holding devices and, of course, obviously greater convenience and performance than more commonly used tool holders, which require the tool holding block to be tapped this way and that into a final adjusted position before being clamped tightly to the cross slide.

In the modification of FIGS. 7-9, functions of the clamping bar and base block are partly combined, such that the horizontal guide portion of the base block may be eliminated altogether, providing for a somewhat simplified, less expensive device. In the device of FIGS. 7-9, the base block 60 comprises only a reference portion, and the horizontally extending guide portion, as such, is omitted. Instead, the clamping bar 61 is provided with a guide portion 62 which projects upward, slightly above the top surface 63 of the machine tool cross slide 64. The reference member 60 is recessed at 65 for the reception of the guide bar 62, and is arranged to be tightly secured thereto by means of a first clamping bolt 66. The dimensions of the slot 65 are such, in relation to the guide bar section 62, that, when the clamping bolt 66 is tightened, the reference block 62 is secured tightly to the cross slide 64.

In the modification of FIGS. 7-9, the adjustable tool holding block 67 is arranged to be supported directly upon the upper surface 63 of the machine tool cross slide, being guided, however, by the guide bar portion 62 of the elongated clamping bar 61. In this respect, the adjustable tool holding block 67 is provided with a longitudinal groove 68 for the reception of the guide bar portion 62. This groove, as is the groove 65 in the reference block 60, is slightly deeper than the projecting portion of the guide 62, in order that the bottom surface 69 of the tool holding block may rest directly upon the upper surface 63 of the cross slide.

As in the case of the first described embodiment, the adjustable tool holding block 67 is provided with a longitudinally elongated through-slot 70 (FIG. 7) in which a second clamping bolt 71 is received. The clamping bolt extends through the tool holding block and is threadedly engaged with the elongated clamping bar 61. A screw shaft 72, with a micrometer adjusting knob 73, is mounted in the reference block 60 and is threadedly engaged with the adjustable tool holding block 67 for precision adjustment of the tool holding block toward and away from the reference block.

In the use of the device of FIGS. 7-9, both of the through-bolts 66, 71 are initially in a loosened condition, allowing the elongated clamping bar 61 to be inserted in and slid along one of the clamping slots 74 in the machine tool cross slide 64. When the device is approximately positioned, the through-bolt 66 is tightened, clamping the reference block 60 tightly to the cross slide, and also tightly securing the elongated clamping bar 61 in a fixed position on the cross slide.

Thereafter, the adjustable tool holding block 67 may be precision manipulated by the micrometer adjustment knob 73. When the cutting tool is in the exact position desired, the second through-bolt 71 is tightened, directly securing the adjustable tool holder to the surface of the cross slide.

As will be readily appreciated, the structure of the modification of FIGS. 7-9 may be readily adapted to the multiple block unit as shown in FIGS. 4-6 hereof.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

We claim:
1. An adjustable tool holding block which comprises
 (a) a reference number,
 (b) clamping means for adjustably securing said reference member to a machine tool slide member, comprising an elongated clamping bar slideably receivable in said slide member and a first clamping bolt extending through said reference member and engaging said clamping bar for fixing the position of said reference member and clamping bar,
 (c) a tool holding block,
 (d) means mounting said tool holding block for slideable adjusting movement toward and away from said reference member,
 (e) movable adjusting means associated with said reference member and connecting said reference member and said tool holding block, for adjustably moving said tool holding block, toward and away from the reference member, and
 (f) a second clamping bolt extending through said tool holding block and engaging said elongated clamping bar, to directly clamp said tool holding block to said machine tool slide,
 (g) said first clamping bolt securing said reference means entirely independently of said tool holding block.

2. An adjustable tool holding block according to claim 1, further characterized by
 (a) said reference member forming part of a base block assembly of generally L-shaped configuration, having a generally horizontal guide portion and a generally vertical reference portion,
 (b) said guide portion extending under said tool holding block in all operative positions thereof and constituting the mounting means therefor,
 (c) a micrometer screw connecting said reference portion and said tool holding block for controlled longitudinal adjusting movement of the tool holding block,
 (d) said first clamping bolt extending vertically through said reference portion,
 (e) said second clamping bolt extending vertically through said tool holding block and said guide portion and into said clamping bar,
 (f) said tool holding block having a longitudinally elongated slot for the reception of said clamping bolt.

3. An adjutable tool holding block according to claim 2, further characterized by
 (a) a second tool holding block mounted on said base block assembly for slideable adjusting movement independent of said first tool holding block,
 (b) a third clamping bolt extending through said second tool holding block and engaging said clamping bar, and
 (c) second adjusting means connecting said reference member and said second tool holding block.

4. An adjustable tool holding block for a lathe or the like, which comprises
 (a) base means having a longitudinal extending guide portion and a reference portion,
 (b) clamping means for securing said reference portion to a machine tool slide member, comprising an elongated clamping bar slideably receivable in said slide member and a first clamping element extending through said reference portion and engaging said clamping bar,
 (c) tool holding block mounted for slideable adjusting movement on and being guided by said guide portion for movement relative to said reference portion,
 (d) movable adjusting means associated with said reference portion and connecting said reference portion and said tool holding block, for adjustably moving said tool holding block along said guide portion, and
 (e) a second clamping element extending through said tool holding block and engaging said clamping bar, to directly clamp said tool holding block to said machine tool slide independently of said first clamping element,
 (f) said first clamping element clamping said reference portion entirely independently of said tool holding block.

5. An adjustable tool holding block according to claim 4, further characterized by (a) said first and second clamping elements being bolts extending respectively through the reference and guide portions and engaging said clamping bar.

6. An adjustable tool holding block according to claim 4, further characterized by
 (a) said guide portion comprising an upwardly projecting rib-like portion of said clamping bar,
 (b) said reference portion comprising a reference block positioned in fixed longitudinal relation to said clamping bar and being movable toward and away from said clamping bar by said first clamping element, and
 (c) said tool holding block being adjustably movable longitudinally along said clamping bar.

* * * * *